Oct. 11, 1966  W. B. NOLAND  3,278,201
SELF-ADJUSTING TRIM FIXTURE FOR PIPES
Filed May 31, 1962
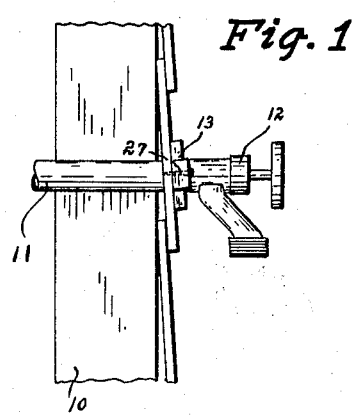
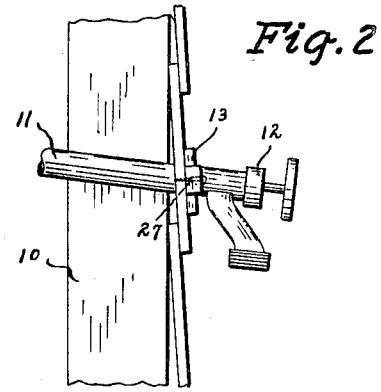
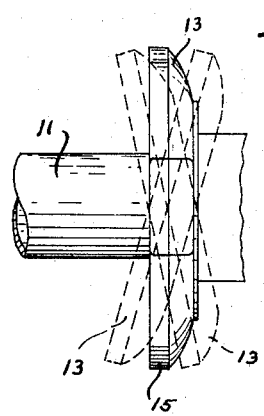
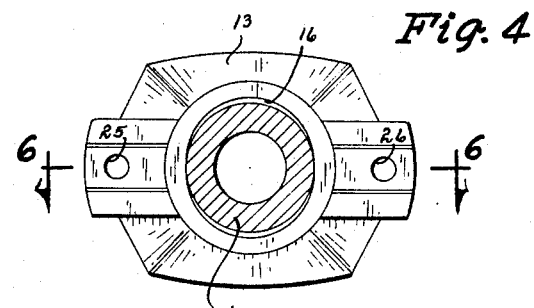
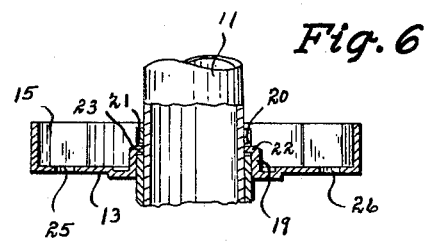
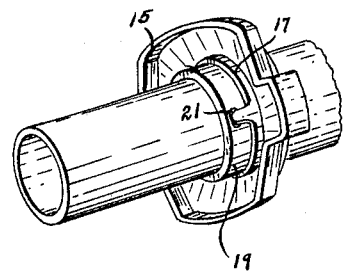
INVENTOR
WAYNE B. NOLAND
BY
Talbert Dick & Earley
ATTORNEYS

United States Patent Office 3,278,201
Patented Oct. 11, 1966

3,278,201
SELF ADJUSTING TRIM FIXTURE FOR PIPES
Wayne B. Noland, Avon Lake, Iowa, assignor to Woodford Manufacturing Company, Des Moines, Iowa, a corporation of Iowa
Filed May 31, 1962, Ser. No. 198,882
3 Claims. (Cl. 285—46)

This invention relates to pipe fixtures and more particularly to a self adjusting trim frame for supporting pipes at the point where they extend through a wall.

It is quite common for houses, barns, buildings and like to have pipes extend through their various walls. These pipes may be conduits bringing fluids into the building or passing fluids out of the building. The holes through which these pipes pass are obviously of diameters greater than that of the diameters of the pipes where the pipes finished rough appearance exists at points where the pipes exit from the wall. Perhaps the most common pipe exiting from a building is a water pipe for providing a water hydrant outside of the building. To better support the pipe and to seal the hole around the pipe it is common to employ a plate frame. This plate frame closely embraces the pipe and is secured to the outside of the wall by screws, bolts or like. However, such herebefore plate frames have certain objections. Firstly, if the pipe does not extend exactly transversely through the wall, the plate frame will not be flush with the wall surface, but instead will have crack openings between some of its edges and the wall surface. Secondly, the outside surface of some walls of buildings are not uniformly vertical and the plate frame will not conform thereto. This is especially true of buildings having lap siding.

Therefore, one of the principal objects of my invention is to provide a trim plate frame for pipes that is automatically adjustable in conforming to both the longitudinal axis of a pipe and/or to the character of the wall surface to which it is secured.

A further object of this invention is to provide a trim plate frame for pipes and like that is easily installed.

A still further object of this invention is to provide a trim plate frame for pipes that will closely embrace the pipe and seal the hole through which the pipe extends.

Still further objects of my invention are to provide a trim plate frame for pipes that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a side view of my device installed around a pipe and on a building having siding strips that are at an angle to the vertical;

FIG. 2 is a side view of my device installed around a pipe and on a building wherein the pipe does not extend through the wall at a perpendicular angle.

FIG. 3 is an enlarged side view of the device showing the adjustments of its movement on and relative to a pipe.

FIG. 4 is an enlarged front view of my device embracing a pipe.

FIG. 5 is an enlarged back perspective view of the device on a pipe and more fully illustrates its construction, and FIG. 6 is an enlarged cross sectional view of the device taken on line 6—6 of FIG. 4.

In these drawings, I have used the numeral 10 to generally designate a wall of a building or like. The numeral 11 designates a pipe. The numeral 12 designates the valve means on the outer end of a water or like pipe. It is to such installations that I install my device and which I will now describe in detail. The numeral 13 designates a base shell housing having its rear side open and adapted to have its rim 15 engaging the surface of the wall 10. In the center area of the shell plate is a hole 16, slightly oblong horizontally, as shown in FIG. 4. At the edge of the hole 16 is a rearwardly extending collar 17. The numeral 19 designates a collar embracing the forward end portion of the pipe 11 and which may be a rearward portion of the valve means 12. This collar is of substantial thickness and may be soldered, threaded or otherwise secured to the pipe 11. The hole 16 and collar 17 embrace the collar 19 of the pipe 11 as shown in FIG. 5. At diametrically opposite horizontal points in the collar 19 I have wells 20 and 21 as shown in FIG. 6. Extending at diametrically opposite horizontal points on the collar 17 are the fingers 22 and 23. These fingers are bent to extend toward each other and pivot in the wells 20 and 21, respectively. By the structure described, the trim fixture plate shell housing 13 will be hinged for limited swinging action relative to the pipe 11 and its vertical width may be swung in both directions from the vertical as shown in FIG. 3. When my device is installed it will fit tightly against the surface of the wall 10 and this will be accomplished even if the wall surface is not vertically straight and even if the pipe 11 does not extend exacty perpendicular through the wall. Quite often, to permit the pipe to drain, and/or to prevent freezing, the pipe extends outwardly and downwardly as shown in FIG. 2. The outside of the base housing 13 may be of any suitable attractive design, however, it should have two screw holes 25 and 26. The plate housing is secured to the wall by suitable means such as bolts, screws 27, or like. The device may be formed of metal, plastic or like. It will give an attractive finish to the side of the building at the point where the pipe extends through the wall. The hole through which the pipe extends, will with the pipe, properly seal and close the hole in the wall.

Some changes may be made in the construction and arrangement of my self adjusting trim fixture for pipes without departing from the real spirit and purpose of my invention, and it is my intention to cover by my claims, any modified forms of structure or use of mechanical equivalents which may be reasonably included within their scope.

I claim:

1. In a trim plate frame for pipes, comprising, in combination,
    a plate member having an oblong hole, said hole having a major and a minor axis,
    a pipe extending through the oblong hole of said plate member, said pipe having an outer diameter substantially equal to the diameter of said oblong hole along its minor axis,
    said pipe having two wells diametrically opposite each other at each side thereof,
    two fingers on said plate at diametrically opposite sides thereof and along the minor axis of said oblong hole, said fingers pivotally received in said two wells respectively to permit said plate member to pivot on said pipe about an axis common to the minor axis of said oblong hole.

2. In a trim plate frame for pipes, comprising, in combination,
    a plate member having an oblong hole, said hole having a major and a minor axis,
    a pipe extending through the oblong hole of said plate member, said pipe having an outer diameter substantially equal to the diameter of said oblong hole along its minor axis,
    said pipe having two wells diametrically opposite each other at each side thereof, two fingers extending inwardly towards each other on said plate at diametrically opposite sides thereof and along the minor axis of said oblong hole, said fingers pivotally received in said two wells respectively to permit said plate member to pivot on said pipe about an axis common to the minor axis of said oblong hole.

3. In a trim plate frame for pipes, comprising, in combination,
 a plate member having an oblong hole, said hole having a major and a minor axis,
 a pipe extending through the oblong hole of said plate member, said pipe having an outer diameter substantially equal to the diameter of said oblong hole along its minor axis,
 said pipe having two wells diametrically opposite each other at each side thereof,
 two fingers extending inwardly towards each other on said plate at diametrically opposite sides thereof and along the minor axis of said oblong hole, said fingers pivotally received in said two wells respectively to permit said plate member to pivot on said pipe about an axis common to the minor axis of said oblong hole, said plate member having at least one screw receiving hole.

References Cited by the Examiner
UNITED STATES PATENTS

| | | | |
|---|---|---|---|
| 730,089 | 6/1903 | Bropson | 285—43 |
| 1,163,457 | 12/1915 | Regar | 137—359 |
| 1,214,220 | 1/1917 | Regar | 285—46 |

CARL W. TOMLIN, *Primary Examiner.*
R. GIANGIORGI, *Assistant Examiner.*